US006980586B1

(12) United States Patent
Ballinger

(10) Patent No.: US 6,980,586 B1
(45) Date of Patent: Dec. 27, 2005

(54) PSEUDO-NOISE ENCODED DIGITAL DATA CLOCK RECOVERY

(75) Inventor: David Ballinger, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/576,056

(22) Filed: May 23, 2000

Related U.S. Application Data

(60) Provisional application No. 60/135,571, filed on May 24, 1999.

(51) Int. Cl.[7] .................................................. H04B 1/69
(52) U.S. Cl. ...................... 375/150; 375/142; 375/147; 375/149; 370/347; 342/352
(58) Field of Search ................................ 375/150, 149, 375/343, 1, 206, 142, 147; 370/347; 342/352

(56) References Cited

U.S. PATENT DOCUMENTS

| | | | |
|---|---|---|---|
| 3,796,868 A | | 3/1974 | Kaul et al. |
| 5,081,462 A | * | 1/1992 | Tachita et al. ............... 342/352 |
| 5,093,841 A | | 3/1992 | Vancraeynest |
| 5,375,140 A | * | 12/1994 | Bustamante et al. ........ 375/142 |
| 5,625,652 A | | 4/1997 | Petranovich |
| 5,768,306 A | * | 6/1998 | Sawahashi et al. .......... 375/150 |
| 6,058,139 A | * | 5/2000 | Horiguchi et al. ........... 375/149 |
| 6,111,910 A | * | 8/2000 | Cui et al. .................... 375/142 |
| 6,141,372 A | * | 10/2000 | Chalmers ..................... 375/147 |
| 6,249,518 B1 | * | 6/2001 | Cui .............................. 370/347 |
| 6,473,450 B1 | * | 10/2002 | Sutterlin et al. ............. 375/142 |

OTHER PUBLICATIONS

Harry Leib; Data-Aided Noncoherent Demodulation of DPSK; Apr. 1995; IEEE Transactiions on Communications; vol. 43; pp. 722-725.*

* cited by examiner

Primary Examiner—Stephen Chin
Assistant Examiner—Sudhanshu C. Pathak
(74) Attorney, Agent, or Firm—Blakely, Sokoloff, Taylor & Zafman LLP

(57) ABSTRACT

A pseudo-noise (PN) encoded digital data clock recovery circuit for recovering an original bit stream from a received chip stream includes a correlator, a phase controller, and a bit clock generator. The correlator correlates a pseudo-noise sequence with the received chip stream and generating a correlator output. The pseudo-noise sequence modulates the original bit stream. The phase controller is configured and arranged to histogram the correlator output of the correlator over the plurality of bit periods. The bit clock generator generates a bit clock which determines a sampling position of the received chip stream to recover the original bit stream from the received chip stream. The bit clock generator uses the histogram of the correlator output to select/adjust the sample position for the bit clock. Accordingly, the pseudo-noise encoded digital data clock recovery circuit reliably synchronizes the bit clock, identifies a correct bit alignment, and tracks a correct bit alignment over time, for example, more than two bit periods, etc.

21 Claims, 18 Drawing Sheets

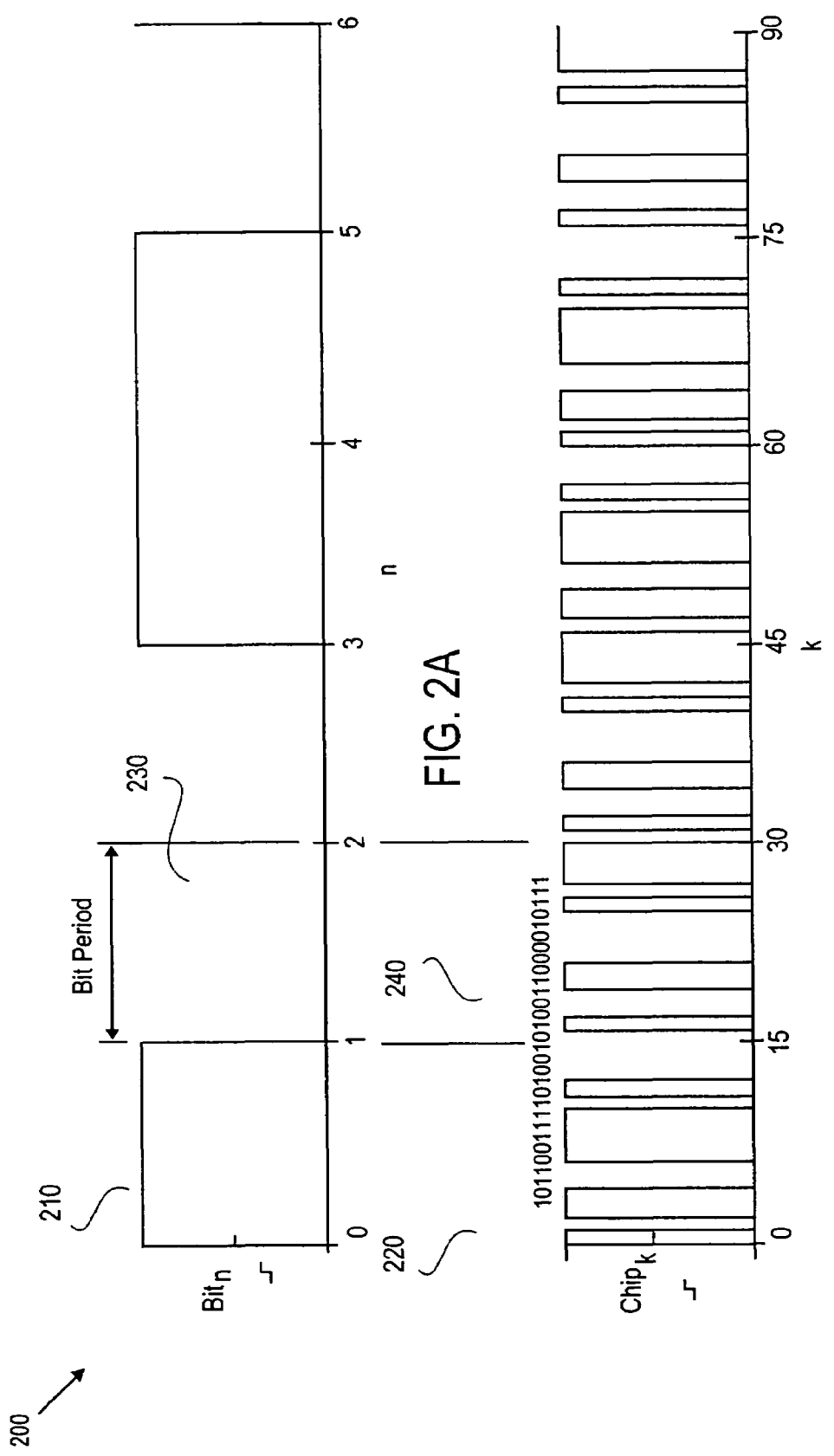

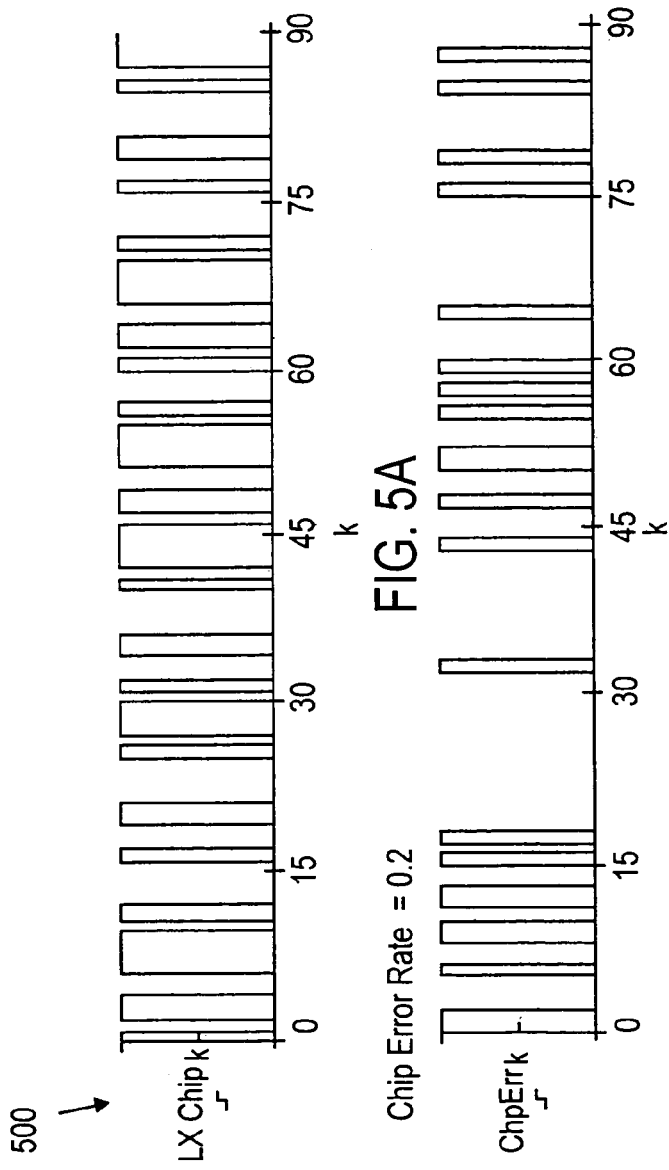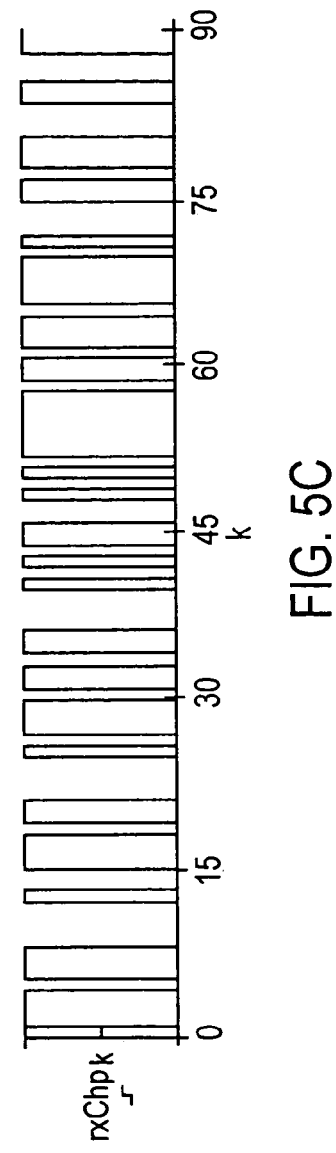

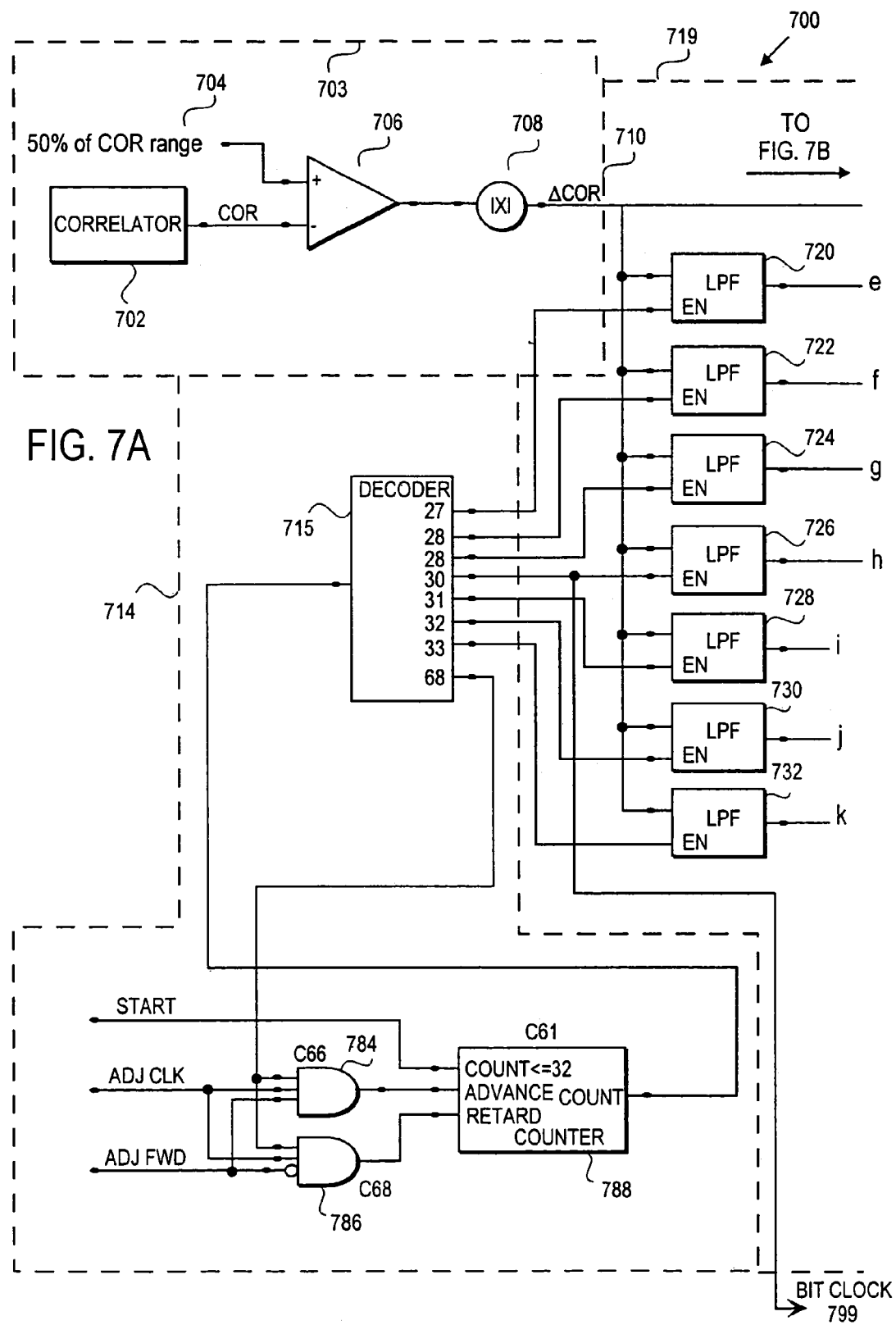

PSEUDO-NOISE ENCODED DIGITAL DATA CLOCK RECOVERY

RELATED APPLICATION

This application claims the benefit of Provisional Application, U.S. Ser. No. 60/135,571, filed on May 24, 1999, entitled "PSEUDO-NOISE ENCODED DIGITAL DATA CLOCK RECOVERY", by David Ballinger.

BACKGROUND OF THE INVENTION

1. Field of the Invention

This invention relates in general to a communication system, and more particularly to a pseudo-noise encoded digital data clock recovery circuit at a receiver of a communication system.

2. Description of Related Art

In communication systems, signals or data are modulated at a transmission end before they are transmitted to a transmission media. At a receiving end, the signals are recovered/demodulated/acquired. Due to the noise and other defects in the transmission media, the received signals often carry errors, such as noise signals, phase shifts, etc. To overcome these problems, communication systems often use an error correcting technique in a recovery circuit at the receiving end to reliably recover the original signals or data. One technique is to use a pseudo-noise encoded digital data clock recovery circuit by correlating a pseudo-noise sequence which is used to encode/modulate the original signals or data at the transmission end with the received signals. More specifically, a serial stream of digital signals or data is modulated by a pseudo-noise sequence known to both a transmitter and a receiver of a communication system. The pseudo-noise sequence is a finite length pseudo-random sequence of bits (e.g., 101100111101000). In this type of modulation, "1" bits in the original data stream are replaced by the true pseudo-noise sequence (e.g., 101100111101000) and "0" bits are replaced by the complement of the true pseudo-noise sequence (e.g. 010011000010111), respectively. Thus, the bit rate of the modulated data stream is M times the bit rate of the original data stream where M is the number of bits in the pseudo-noise sequence, e.g. M is fifteen (15).

Traditionally, the individual bits in a pseudo-noise sequence are often referred to as "chips". Henceforth, the bits in the original data stream is hereinafter referred to as "bits", and the pseudo-noise bits in the modulated data stream is hereinafter referred to as "chips".

In the existing communication systems, an additional modulation step is usually used, whereby an analog carrier signal is modulated by the pseudo-noise modulated data stream for effective transmission over a physical medium (e.g., PSK, FM). In some systems, a received signal is first demodulated to recover the pseudo-noise modulated chip stream generated by at the transmitter, while other systems recover an original bit stream directly from the received analog signal in one demodulation step.

Typically, the receiver can recover the original bit stream by looking for matches of the pseudo-noise sequence or its complement, within the incoming chip stream. However, if the transmission media is noisy resulting in frequent chip errors, a more sophisticated method is needed to recover the data. The greater the chip error rate, the more difficult it is to recognize the pseudo-noise sequence or its complement in a received chip stream. A bit period is defined as the time interval spanned by one bit before pseudo-noise modulation and by the M chips of the true or complement pseudo-noise sequence after modulation. If an alignment of the original bit period within the chip stream is known, then the data can be recovered by comparing the chips in the pseudo-noise sequence with their counterparts in the incoming chip stream and counting up the matches. If the number of matches is close to the number of chips in the pseudo-noise sequence, then the original bit is most likely a One (1 bit). Otherwise, if the number of matches is close to zero, then the original bit is most likely a Zero (0 bit). If the number of matches falls somewhere near the middle of the range, i.e. falls somewhere near the middle between zero and the number of chips in the pseudo-noise sequence, then most likely the presumed alignment of the original bit period is not correct. In fact, the alignment of the bit period within the received chip stream must be precisely identified before the original data can be reliably recovered.

In the existing communication systems, a correct bit period is typically identified by correlating the chip stream with the pseudo-noise sequence. Specifically, a chip stream is shifted through a correlator circuit that, at each shift increment, attempts to match the sequence of chips in the correlator with the pseudo-noise sequence and outputs the number of matching chips. Once a pseudo-noise sequence alignment is found, then the correlator can be used to recover the original data stream. Typically, if the pseudo-noise sequence is chosen carefully, even with a high chip error rate, the correlator will produce a value near one of the extremes of its range, i.e. zero to M, if a bit period of the chip stream is perfectly aligned with the correlator's reference pseudo-noise sequence and a value near the middle of its range otherwise.

In the existing communication systems, an upper and a lower threshold is applied to a correlator output. As a result, a thresholded correlator output is generated. The thresholded correlator output indicates whether the correlator has exceeded either the upper or lower threshold. In other words, the thresholded correlator output indicates whether the correlator output is near one of the extremes and not in the middle. One would expect to see a spike (binary one) on a correlator output every time a true or its complement pseudo-noise sequence in the incoming chip stream comes into alignment with the correlator's reference pseudo-noise sequence. A binary signal, called a "bit clock" or "detection signal", is derived from the thresholded correlator output. The bit clock or detection signal is a periodic signal which indicates when the output of the correlator should be looked at to determine the original bit stream, i.e., when the bit period of the incoming chip stream is presumed to be aligned with the reference pseudo-noise sequence in the correlator.

The simplest derivation of the bit clock is to use a thresholded correlator output. If the chip error rate is low enough, then this scheme is sufficient to produce a reliable, periodic bit clock with no misaligned or dropped cycles. Ideally, the correlator output does not produce spurious spikes in between bit period boundaries or drops spikes at bit period boundaries. Alternatively, a clock divider, which is resynchronized to spikes of the correlator output when those spikes are deemed to mark true bit boundaries, could generate a bit clock. For example, a bit clock could be generated with a fairly high degree of confidence if the bit clock is resynchronized only after observing some number N consecutive spikes of the same periodicity as the bit rate on the correlator output.

Typically, clocks used at the transmitter and receiver of a communication system are not synchronized because their oscillators are independent. Therefore, the derived bit clock at the receiver often drifts out of phase with respect to a bit period in the transmitted signal unless its synchronization is maintained. The problem of identifying the correct bit period alignment covers not only an initial identification of this alignment ("acquisition") but also the maintaining of the correct alignment over time ("tracking"). In the existing systems, a correlator output is used to periodically adjust the phase of the bit clock in the same way that the correlator output is used to initially synchronize the bit clock.

Also, in some existing systems, the received chip stream is oversampled by a rate that is the chip rate multiplied by a whole number. The resulting stream is correlated with the pseudo-noise sequence in much the same way as before, except instead of comparing every element in the correlator shift register with the pseudo-noise sequence, every Kth element is compared with the pseudo-noise sequence, where K is the number of samples per chip.

Oversampling techniques have advantages for bit clock phase alignment. In a system using an oversampling technique, a thresholded correlator output would produce a series of K consecutive spikes once every bit period. In theory, the data clock recovery circuit could use the correlator output at any of the sample positions associated with this series. However, with errors in the received chip stream or with phase drift between the transmitter and receiver clocks, the optimal sample position for data recovery is typically the one that occurs in the center of the intervals where this series of spikes is expected on the correlator output.

In receivers where there is one sample per chip, and there is phase drift between the transmitter and the receiver, bit clock tracking is problematic. When the optimal sample position of the correlator output drifts from one position to an adjacent position, the phase of the generated bit clock follows the drift with a small time lag since it takes at least one bit period for the bit clock to synchronize. With multiple samples per chip, the problem is solved. The bit clock phase can be off by one sample position from the optimal sample position but does not compromise the recovery of the data. In receivers where there is only one sample per chip, if the bit clock is off by one sample position, then the recovered data would be erroneous.

In systems where there are multiple samples per chip, chips are generally recovered in a lower error rate when the chips are sampled nearer to the center of the chip period. This results in a more reliable correlator output. Therefore, if the received chip stream is sampled multiple times in each chip period, then the bit clock generator can choose the best sample position within the interval of expected spikes at the thresholded correlator output.

However, in applications with particularly high chip error rates, e.g. 1 in 10 or 1 in 5, the oversampling technique and other techniques described above are not sufficiently robust to align the bit clock with a high degree of confidence. With such error rates, the correlator frequently generates false spikes on its threshold output when a pseudo-noise sequence is not aligned with the bit period of the incoming chip stream and, conversely, the correlator does not generate correct spikes even when a pseudo-noise sequence is aligned with the bit period of the incoming chip stream.

It can be seen then that there is a need for a pseudo-noise encoded digital data clock recovery circuit that reliably synchronizes a bit clock, identifies a correct bit alignment, and tracks the correct bit alignment over time.

It can also be seen that there is a need for a pseudo-noise encoded digital data clock recovery circuit that recovers an original bit stream from a digital chip stream in a noisy transmission media with high error rates.

It is with respect to these and other considerations that the present invention has been made.

SUMMARY OF THE INVENTION

To overcome the limitations in the prior art described above, and to overcome other limitations that will become apparent upon reading and understanding the present specification, the present invention discloses a pseudo-noise encoded digital data clock recovery circuit that recovers an original bit stream from a received chip stream.

The present invention solves the above-described problems by providing a pseudo-noise encoded digital data clock recovery circuit that reliably synchronizes a bit clock, identifies a correct bit alignment, and tracks a correct bit alignment over time.

In one embodiment in accordance with the principles of the present invention, a method for recovering an original bit stream from a received chip stream in a communication system includes the steps of maintaining a history of correlation of the received digital chip stream with a pseudo-noise sequence over more than two bit periods; and synchronizing a bit clock by using the history of correlation.

Still in one embodiment, the step of maintaining the history of correlation includes histogramming a correlator output over all possible sample positions for the bit clock. In another embodiment, the step of maintaining the history of correlation includes histogramming a correlator output over a finite window of sample positions for the bit clock.

Further in one embodiment, the step of maintaining the history of correlation includes histogramming a correlator output for a finite number of bit periods and restarting histogramming after the finite number of bit periods. In another embodiment, the step of maintaining the history of correlation includes histogramming continuously by digitally low pass filtering a correlator output.

In one embodiment, the method further includes the steps of providing a threshold, comparing the correlator output to the threshold, and generating a thresholded correlator output. The step of maintaining the history of correlation includes histogramming the thresholded correlator output with a corresponding counter at the all possible sampling positions. In another embodiment, the step of maintaining the history of correlation includes histogramming the correlator output directly with a plurality of accumulators.

Yet in one embodiment, the step of synchronizing the bit clock is based on the histogram of the counters or accumulators that exceed a preset threshold. In another embodiment, the step of synchronizing the bit clock is based on a calculated average sample position for the bit clock.

The present invention also provides a pseudo-noise encoded digital data clock recovery circuit for recovering an original bit stream from a received chip stream. In one embodiment, the circuit includes: a correlator for correlating a pseudo-noise sequence with the received chip stream and generating a correlator output, the pseudo-noise sequence modulating the original bit stream; a phase controller, coupled to the correlator, being configured and arranged to histogram the correlator output of the correlator over the plurality of bit periods; and a bit clock generator, coupled to the phase controller, for generating a bit clock which determines a sampling position of the received chip stream to recover the original bit stream from the received chip stream, the bit clock generator using the histogram of the correlator output to select/adjust the sample position for the bit clock.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 7A–7C illustrate a detailed diagram of a third embodiment of the pseudo-noise encoded digital data clock recovery circuit in accordance with the principles of the present invention.

DETAILED DESCRIPTION OF THE INVENTION

In the following description of the exemplary embodiment, reference is made to the accompanying drawings which form a part hereof, and in which it is shown by way of illustration the specific embodiment in which the invention may be practiced. It is to be understood that other embodiments may be utilized as structural changes may be made without departing from the scope of the present invention.

The present invention provides a pseudo-noise encoded digital data clock recovery circuit that recovers an original bit stream from a received chip stream. The pseudo-noise encoded digital data clock recovery circuit reliably synchronizes a bit clock, identifies a correct bit alignment, and tracks a correct bit alignment over time, for example, more than two bit periods, etc.

Exemplary embodiments and/or implementations in accordance with the principles of the present invention are set forth below. The commonality of the different embodiments and/or implementations is that the clock recovery circuit uses a bit clock generator to generate a history of correlator outputs over a plurality of bit periods. The history of the correlator outputs over the plurality of bit periods is used by a phase controller to select the most likely "correct" phase for a bit clock. The bit clock is used to sample the received signals thereby recovering/acquiring the original data from the received signals.

Figure 1:
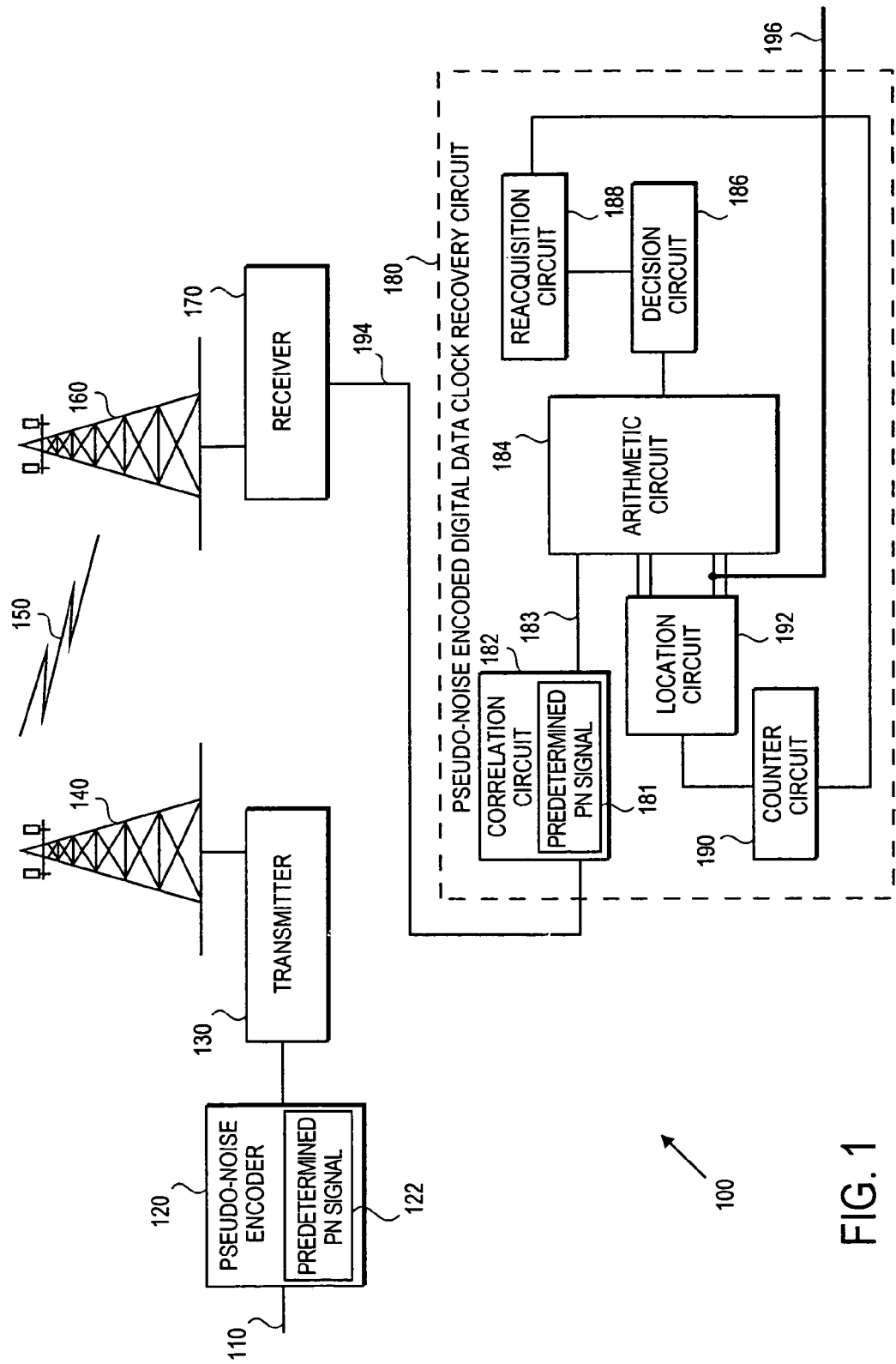
FIG. 1 illustrates a diagram of an exemplary communication system using a pseudo-noise encoded digital data clock recovery circuit in accordance with the principles of the present invention.

FIG. 1 illustrates a diagram of an exemplary communication system 100 using a pseudo-noise encoded digital data clock recovery circuit 180 in accordance with the principles of the present invention. The communication system 100 includes a pseudo-noise encoder 120 which receives original data stream 110 (or referred to as an original bit stream). The data 110 is modulated by a pseudo-noise sequence 122 in the pseudo-noise encoder 120. In this type of modulation, '1' bits in the original bit stream are replaced by a selected pseudo-noise sequence 122, and '0' bits in the original bit stream are replaced by the complement of the selected pseudo-noise sequence 122.

The communication system 100 may include a further modulation step where an analog carrier signal is modulated by the pseudo-noise modulated data stream or sequence for effective transmission over a physical medium (e.g., PSK, FM). The data is transferred via the transmitter 130 where it is transmitted via an antenna 140 or other suitable means.

Transmitted signals 150 are received by a receive site antenna 160 or other suitable means. The signals 150 are captured by a receiver circuit 170. If there is an analog modulation step implemented in a transmitter 130, then a digital chip stream 194 is recovered from the transmitted signals 150 by a demodulation step which may be implemented in the receiver circuit 170. Then, the pseudo-noise encoded digital data clock recovery circuit 180 decodes the modulated signal (referred to as a chip stream) to obtain the original bit stream 110 via an output signal 196. In some systems, the signals 150 are first demodulated to recover the same chip stream generated by the pseudo-noise encoder 120 while in other systems, the original bit stream is recovered directly from the received analog signals in one demodulation step.

The pseudo-noise encoded digital data clock recovery circuit 180 includes a correlation circuit 182 for determining the number of matches between the predetermined pseudo-noise (PN) signal 181 and the received signal. The predetermined PN signal 181 is the same as the predetermined PN signal 122 at the transmitter end. An arithmetic circuit 184 may be used to count/accumulate the number of matches for a sample position.

In FIG. 1, the clock recovery circuit 180 also includes a decision circuit 186 which determines whether the data stream 183 should be phase-shifted within a selected window of chips to align the data stream 183 with the predetermined pseudo-noise signal 181. A reacquisition circuit 188 may be used to reacquire a preliminary bit clock signal, which includes resetting components, such as counters, and registers, etc. A location circuit 192 may be used to select an accumulator/counter aligned with a current chip position in the PN correlated chip stream. The bit clock or detection signal 196 provides output signals of the circuit 180. The output signals are used as a bit clock which has the most 'correct' phase for resampling the PN correlated chip stream to recover the original bit stream.

Figure 2C:
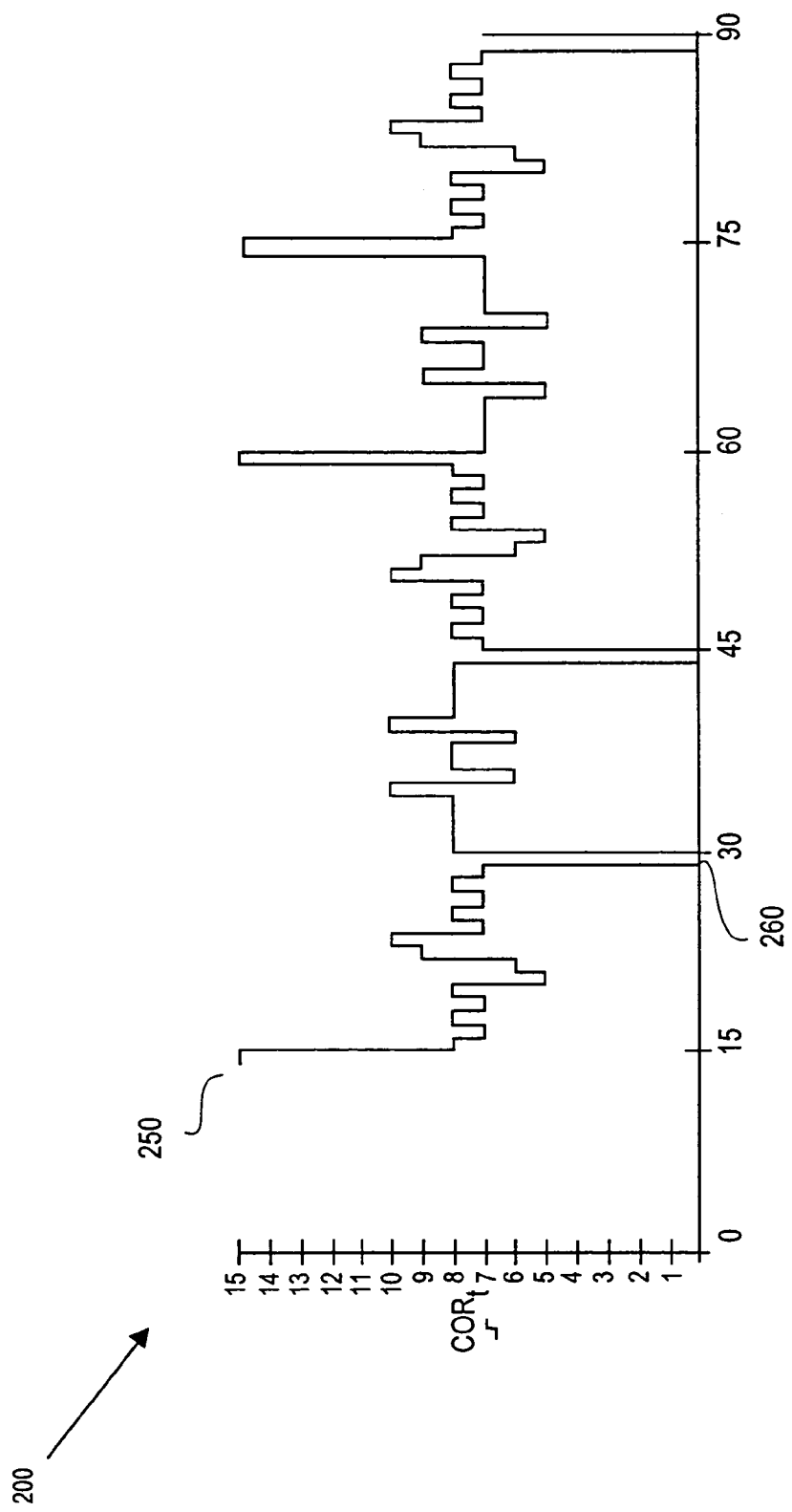
FIG. 2 illustrates a diagram of an exemplary original bit stream (a) at a transmitter, a corresponding pseudo-noise sequence encoded chip stream (b) at a transmitter, and a a corresponding correlator output (c), over six bit periods.

FIG. 2 illustrates diagrams 200 of an exemplary original bit stream 2(a) at a transmitter, a corresponding pseudo-noise sequence encoded chip stream 2(b) at a transmitter, and a corresponding correlator output 2(c), over six bit period. Diagram (a) shows an original bit stream of ones and zeros, e.g. an original bit stream of 100110. Diagram (b) shows a transmitted chip stream correlating to the ones and zeros of Diagram (a). In this type of modulation, "1" bits in the original bit stream are replaced by the true pseudo-noise sequence, e.g. 101100111101000, and "0" bits in the original bit stream are replaced by its complement, e.g. 010011000010111. Thus, the bit rate of the modulated data stream is M times the bit rate of the original bit stream where M is the number of bits in the pseudo-noise sequence, in this example, M is fifteen (15). The recovery circuit can recover the original bit stream by looking for matches with the pseudo-noise sequence, e.g. 101100111101000, and its complement 010011000010111, within the incoming chip stream. However, if the communication channel is noisy, resulting in frequent chip errors, a more sophisticated method is needed to recover the data. Diagram (c) shows a correlator output. The correlator output indicates the degree of correlation between the received chip stream and the pseudo-noise sequence.

Figure 3A:
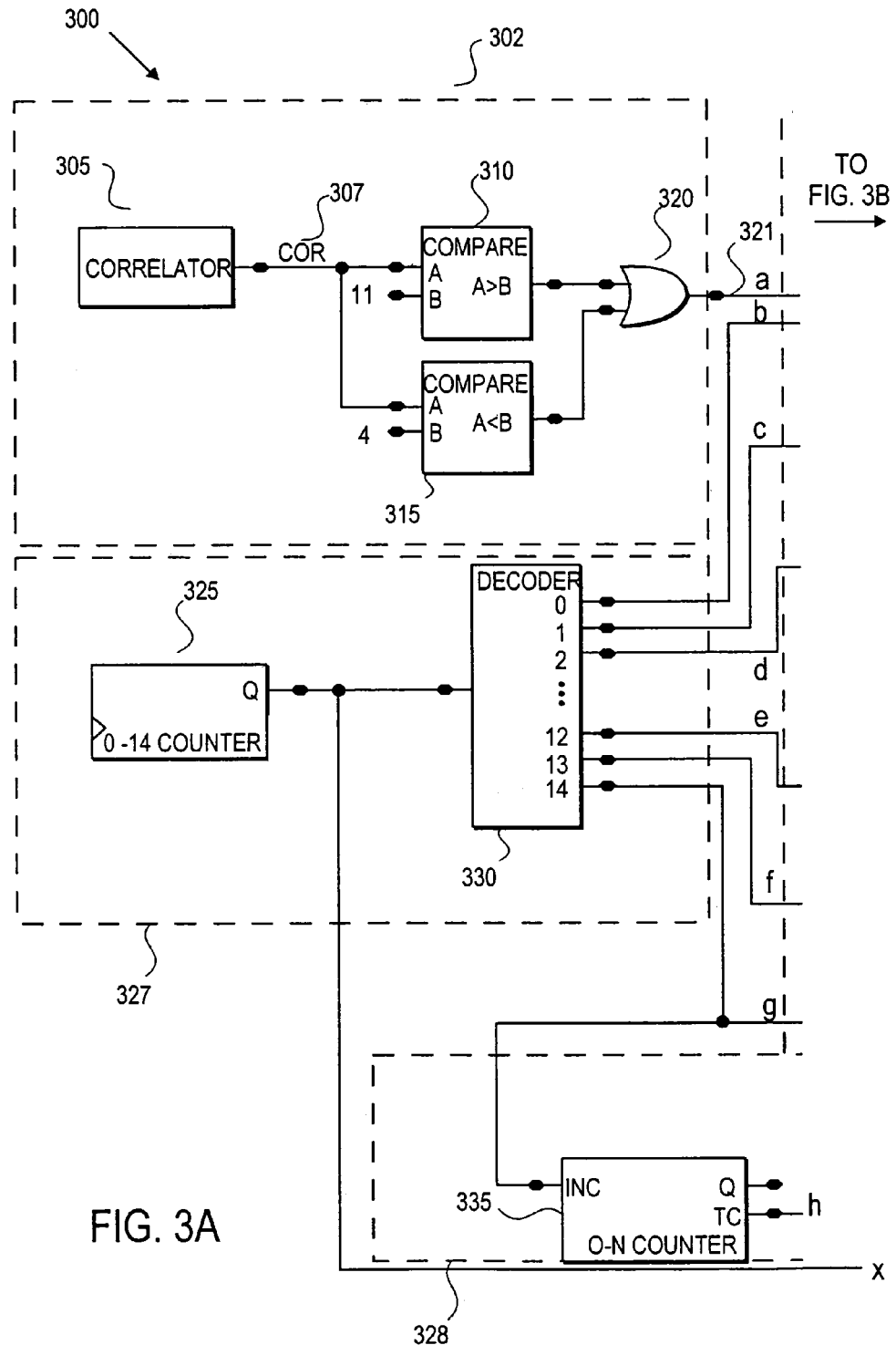
FIGS. 3A–3C illustrate a detailed diagram of a first embodiment of a pseudo-noise encoded digital data clock recovery circuit in accordance with the principles of the present invention.
Figure 3B:
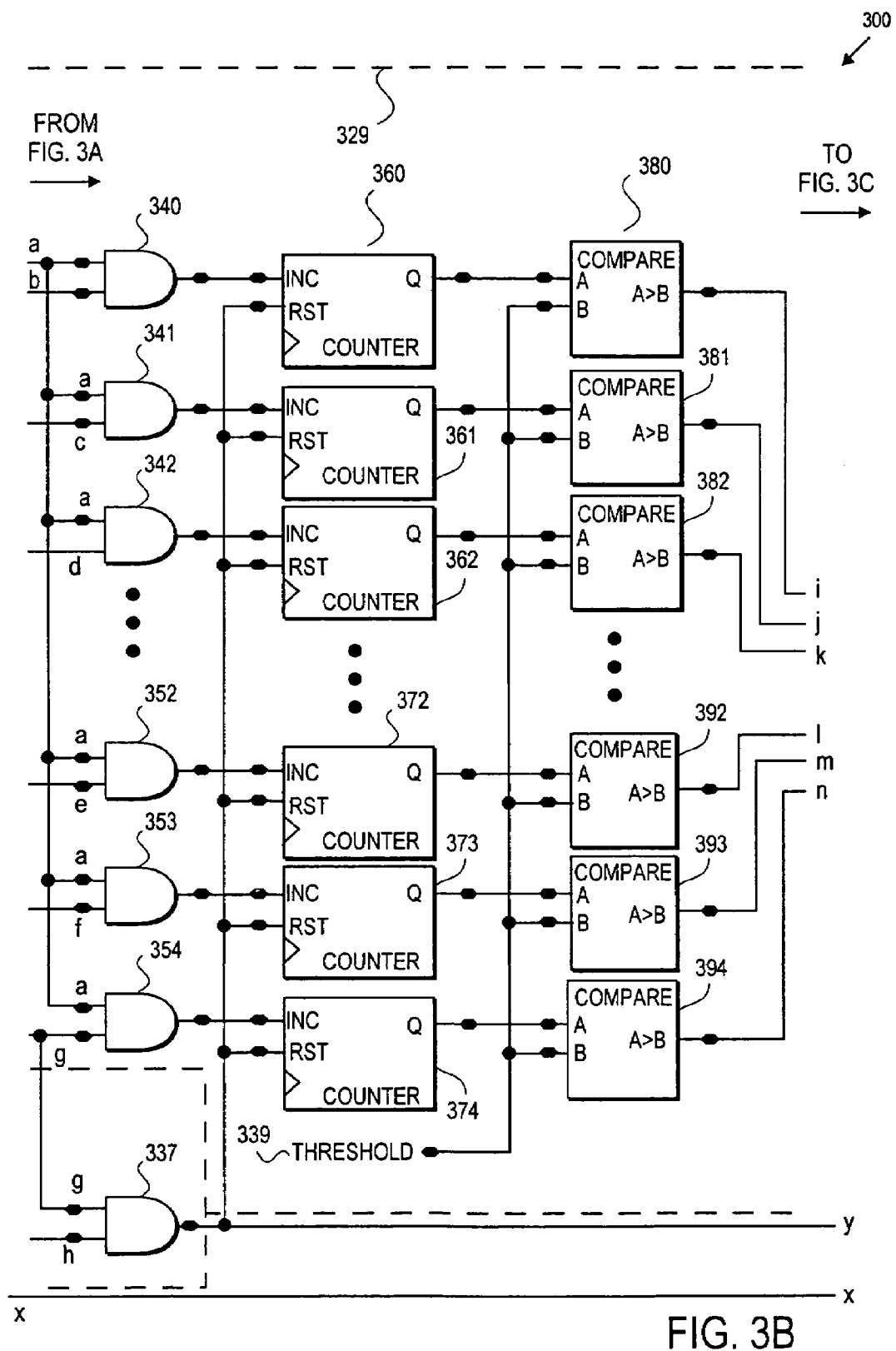
Figure 3C:
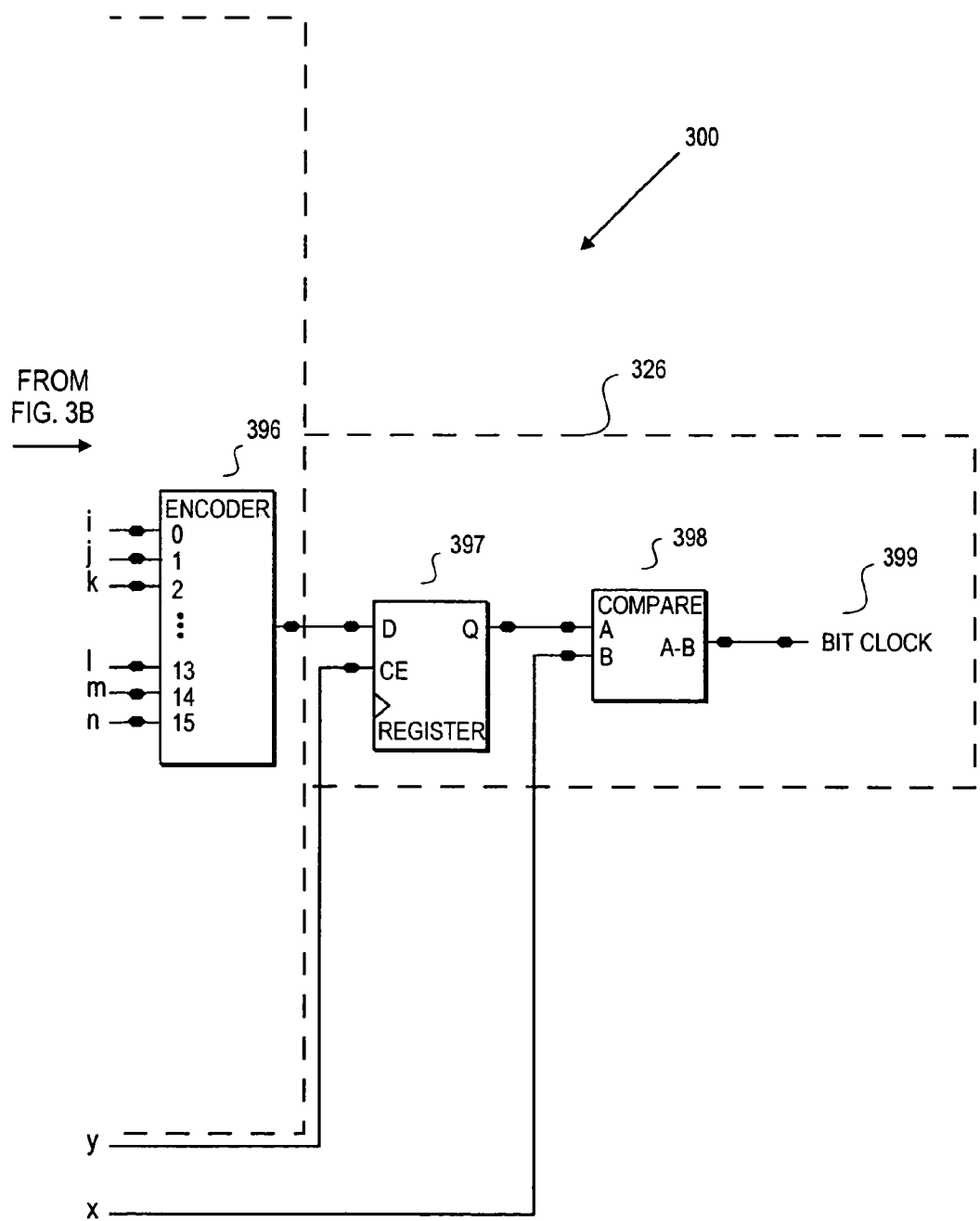

FIGS. 3A–3C illustrate a detailed diagram of a first embodiment of a pseudo-noise encoded digital data clock recovery circuit 300 in accordance with the principles of the present invention. In this embodiment, the pseudo-noise encoded digital data clock recovery circuit 300 correlates the received chip stream with a reference pseudo-noise sequence to generate a correlator output 307. The correlator output 307 is then compared to an upper threshold 310 and a lower threshold 315, and the resulting signals from the upper and lower thresholds are ORed together at a OR gate 320. The OR gate 320 generates a thresholded correlator output signal 321.

A modulo-15 counter 325 in a location circuit 327 is used to select an appropriate sample counter from fifteen counters 360, 361, 362, . . . , 374 to increment via a decoder 330 and an associated AND gates 340, 341, 342, . . . , 354. The counters 360–374 in an arithmetic circuit 329 are incremented by logically ANDing, at the AND gates 340–354, the signal from the OR gate 320 and the signal from the decoder 330 for all sample positions within a bit period for N consecutive bit periods.

The counter, 360–374, for each sample position within a bit period is incremented when the correlator output 307 produces a spike at that sample position. A bit period counter 335 of a counter circuit 328 controls the end of the N bit periods. At that time, the values of the counters are compared with a predetermined threshold 339 by comparators 380, 381, 382, . . . , 394 in the arithmetic circuit 329. The resulting signals are sent to an encoder 396, a register 397, and a comparator 398. A bit clock or detector signal 399 is generated from a decision circuit 326. Accordingly, at the end of N bit periods which is recorded by the bit period counter 335, if there is one counter, 360–374, whose value exceeds the threshold 339, when compared by the comparators 380–394, then the bit clock 399 is aligned to that counter's sample position via the encoder 396. On the other hand, if no counters, 360–374, exceed the threshold 339, then the alignment of the bit clock 399 is not adjusted. The values in the set of counters 340 through 374 taken together are henceforth referred to as a "histogram" as they represent the cumulative number of thresholded correlator output spikes over multiple bit periods as a function of sample position within the bit period. The process of creating this histogram, i.e., incrementing the counters, is henceforth referred to as "histogramming the thresholded correlator output."

In systems with multiple samples per chip (referred to as "oversampled") which will be described in details in FIGS. 4A–4C, the clock recovery circuit looks for a series of consecutive samples in one bit period to see whether the corresponding counter values exceed a threshold and decide whether the phase shift of the bit clock, is needed. If a counter exceeds the threshold outside the range of counters associated with the chip position of the current bit clock, the bit clock is re-aligned at a different sample position, for example, advancing one sample position or retarding one sample position. If no counters exceed the threshold, the bit clock still remains at the same sample position.

In systems with oversampled chip streams, the correlator output histogram can be efficiently realized by implementing counters (e.g. the counters 460 through 465) for only a subset of the total sample positions of a bit period. This subset consists of a cluster of consecutive samples spanning an interval, or "window", slightly larger than one chip period. The alignment of this window, relative to the correlator output, is initially set by a reacquisition circuit (e.g. a reacquisition circuit 451 as shown in FIGS. 4A–4C) based on a preliminary estimate of the most likely position of the corrector bit clock. Preferably, the alignment of this window is such that there is a margin of at least one sample position on either side of the chip period associated with the bit clock. Also, after N bit periods, the counters, such as the counters 360–374, and the registers, such as the register 397, are reset, and the histogram process starts again.

Figure 4A:
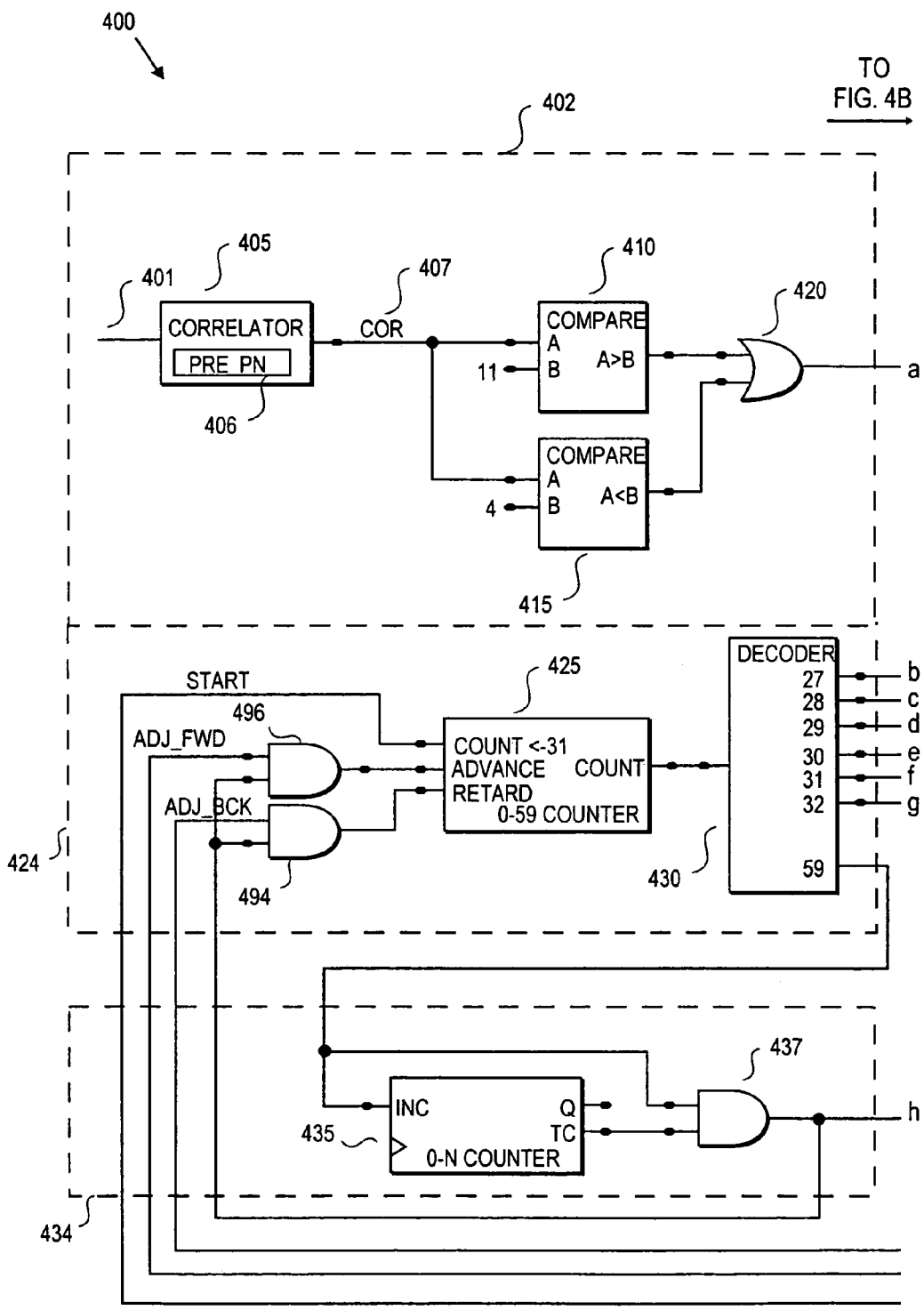
FIGS. 4A–4C illustrate a detailed diagram of a second embodiment of the pseudo-noise encoded digital data clock recovery circuit in accordance with the principles of the present invention.
Figure 4B:
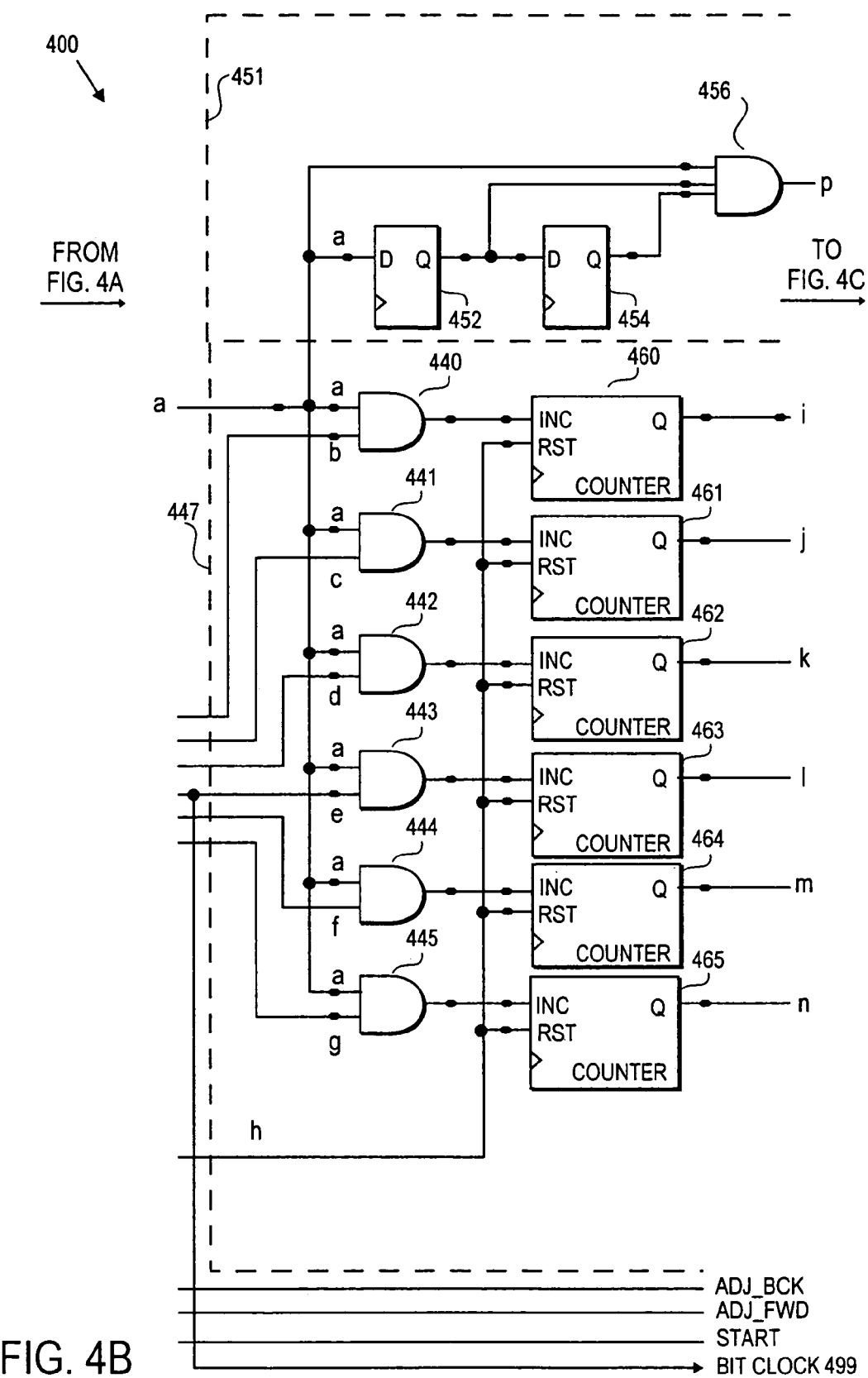
Figure 4C:
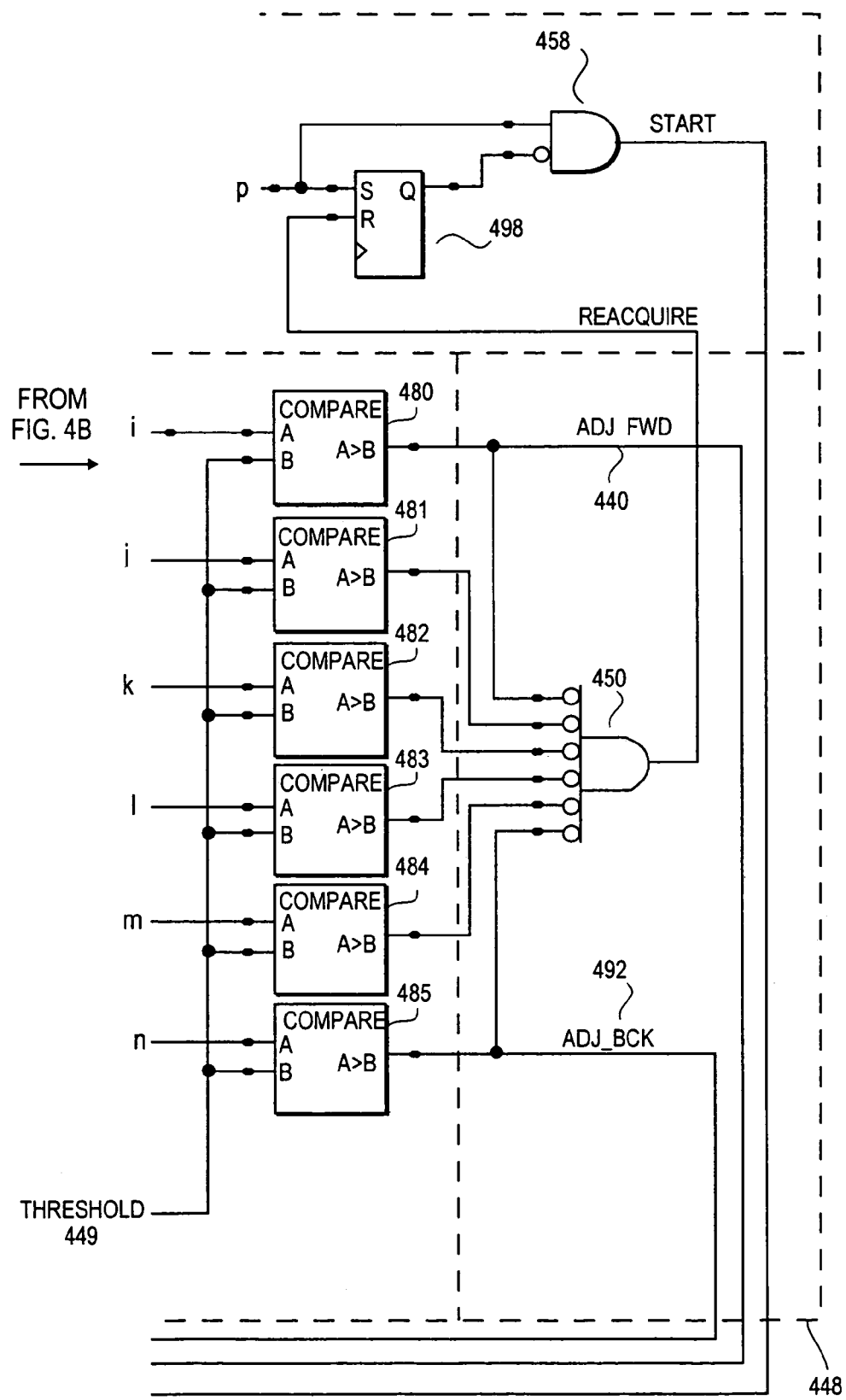

FIGS. 4A–4C illustrate a detailed diagram of a second embodiment of the pseudo-noise encoded digital data clock recovery circuit 400 in accordance with the principles of the present invention. As shown in FIGS. 4A–4C, fewer counters are used in comparison to the counters used in the embodiment shown in FIGS. 3A–3C. For illustrated purposes, six counters 460–465 are used to histogram over a window of consecutive sample positions (e.g. 6 samples) which spans a subset of the total sample positions within a bit period (e.g. 60 sample positions). A window of consecutive sample positions is chosen to be larger than the bit period of one chip while a margin of one sample is at the either side of the chip period. A correlator output 407 from a correlator 405 in a correlation circuit 402 is compared to an upper threshold 410 and a lower threshold 415. The resulting signals are ORed together at a OR gate 420.

A modulo-60 counter 425 in a location circuit 424 is used to select an appropriate sample counter from the six counters 460–465 to increment via a decoder 430 and an associated AND gates 440–445 in an arithmetic circuit 447. The counters 460–465 in the arithmetic circuit 447 are incremented by logically ANDing, at the AND gates 440–445, the signal from the OR gate 420 and the signal from the decoder 430 for all sample positions within a bit period for N consecutive bit periods. The counter, 460–445, for each sample position within a bit period is incremented when the correlator output 407 produces a spike at that sample position.

As shown in FIGS. 4A–4C, a system may employ four samples per chip and implement a six-sample histogram window. In such a system, one would expect to see spikes at the correlator output 407 most often during the four consecutive sample positions when the bit period of the incoming chip stream 401 is aligned with the reference pseudo-noise sequence 406 in the correlator 405. During the initial acquisition of the bit clock from the received chip stream 401, the histogram window can be initially placed so as to bracket the four sample positions where 'true' correlator output spikes are expected. The correlator output spikes represent the alignment of the bit period in the received chip stream 401 with the reference pseudo-noise sequence 406. This initial placement of the window may be based on some quick means of guessing where the true correlator output spikes are expected. Using this example, one way of initially placing the window would be to center the window around the first three or four consecutive correlator output spikes observed at the correlator output 407. After this initial placement, the correlator output 407 is histogrammed for N bit periods for those sample positions that fall within the window.

Accordingly, at the end of the N bit periods which is controlled by a bit period counter 435 in a counter circuit 434, a bit clock 499 is centered within the sample positions whose histogram counters 460–465 exceed a threshold 449 as depicted in the arithmetic circuit 447. If the alignment of the resulting bit clock is not centered within the window, then the window is shifted via sending an adjust-forward signal, ADJ_FWD 490, or an adjust-backward signal, ADJ_BCK 492, from a decision circuit 448 to the counter 425. Two AND gates 494, 496 are used to make sure that the window shift occurs at the end of the histogram pass. The counter 425 outputs a signal which adjusts the sample histogram window. This window shift requires a means of determining whether the initial or the prior window placement is incorrect, and that the acquisition step should be repeated. One of the means of doing so is to declare the initial window placement invalid if a certain number of consecutive histogram passes (each spanning N bit periods) are performed but the histogram counters 460–465 do not exceed the required threshold. At this point, a set/reset device 498 in the reacquisition circuit 451 is used. The inverted signals from the comparators 480–485 are sent to an AND gate 450 along with the proper sequence of signals through additional reacquisition devices 452, 454, 456, 458 in the reacquisition circuit 451. It is appreciated that other means of placing and shifting the window can be used within the scope of the present invention.

Figure 5D:
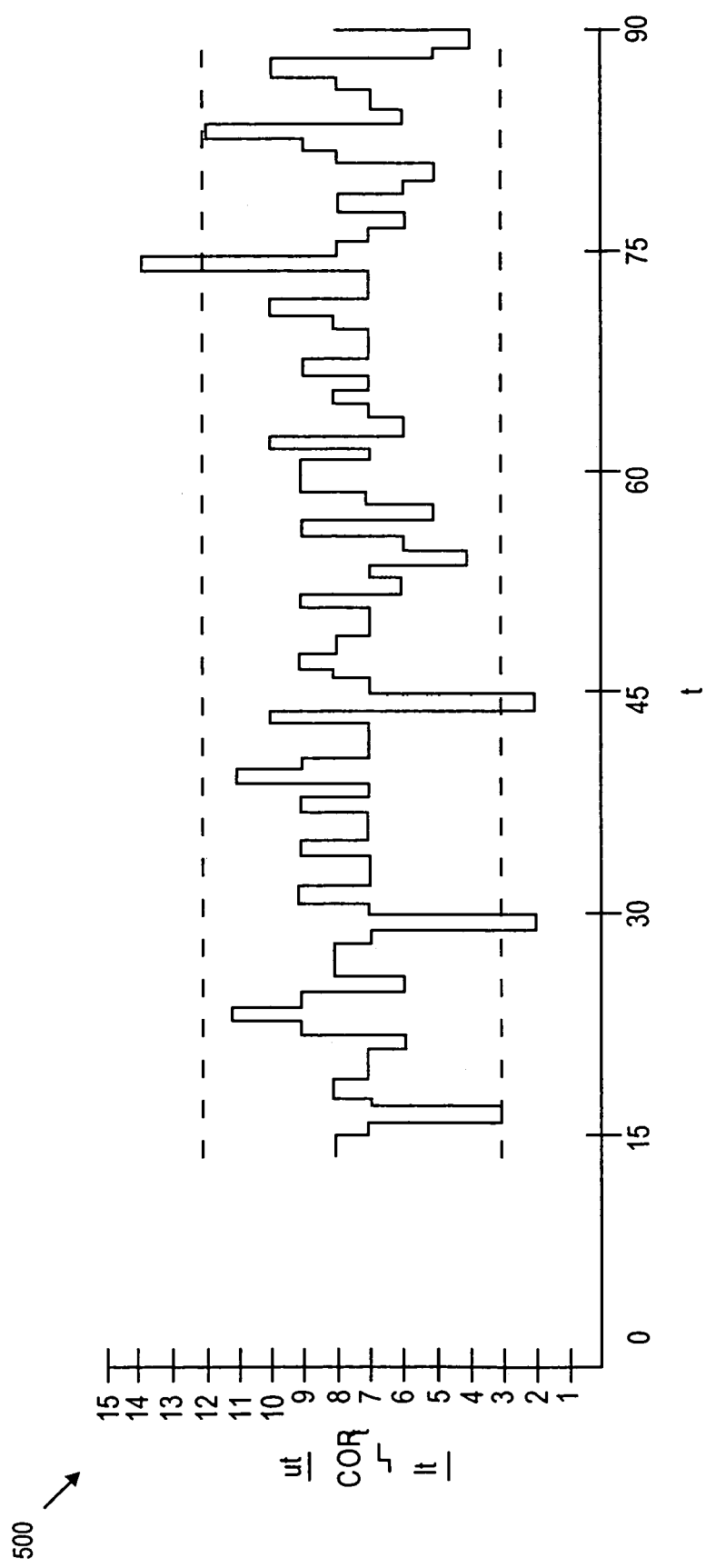
FIG. 5 illustrates diagrams of an exemplary transmitted chip stream (a) at a transmitter, an exemplary error function (b), a corresponding received chip stream (c) at a receiver, a corresponding correlator output (d), a corresponding deviation of the correlator output (e), and a corresponding thresholded correlator output (f), over six bit periods.
Figure 5E:
Figure 5F:
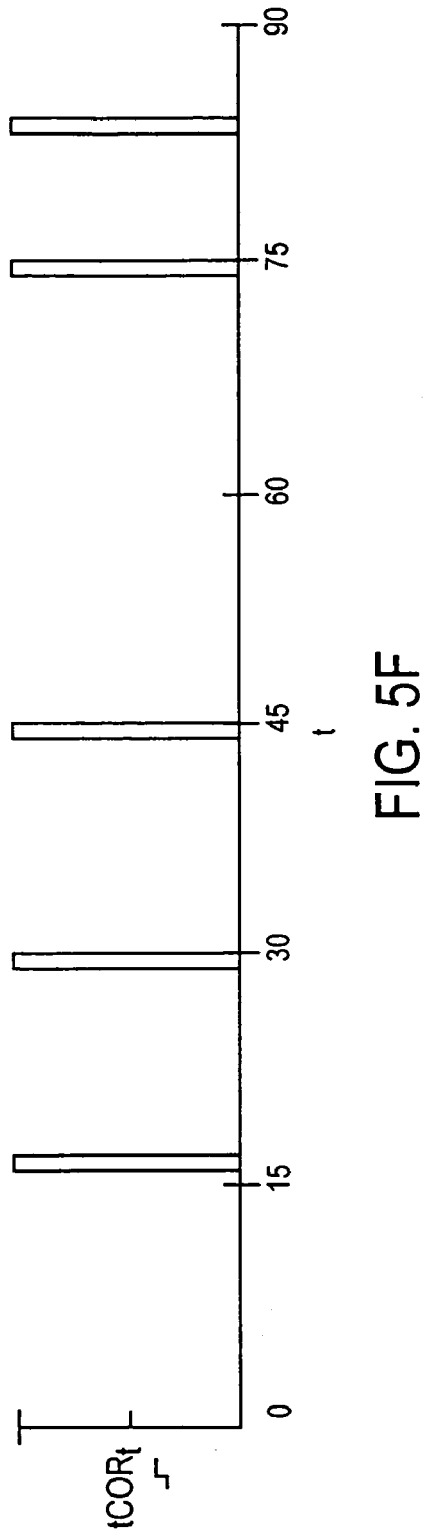

FIG. 5 illustrates diagrams of an exemplary transmitted chip stream (a) at a transmitter, an exemplary error function (b), and a corresponding received chip stream (c) at a receiver, over six bit periods. As shown, the transmitted chip stream (a) is different from the received chip stream (c) because the communication channel or transmission media is noisy resulting in frequent chip errors (e.g. the chip error rate is 0.2). An exemplary error function ChpErr (b) indicates where chips in the received chip stream are inverted due to the noise. The greater the chip error rate, the more difficult it is to recognize the pseudo-noise sequence or its complement in the received chip stream (rxChip) (c).

The corresponding correlator output (d) can then be sent to the arithmetic circuit of the clock recovery circuit as described above. In one embodiment as previously described, counters are used to count the number of thresholded correlator output spikes. In another embodiment, the correlator output can be histogrammed directly by using accumulators to integrate the correlator output directly in each sample position over multiple bit periods, instead of counters which increment in response to a spike at he thresholded correlator output. This may need more register bits to implement, but the result maintains a more accurate history of the correlator output. At each sample position (within the histogram window if using a subset of sampling positions in a bit period), a deviation value ΔCOR is added to the corresponding accumulator which represents the degree of correlation between the received chip stream and the pseudo-noise sequence or its complement. More specifically, ΔCOR is a measure of the deviation of the correlator output, COR, from the center of its range. For example, in a system with fifteen (15) chips per bit period, the correlator produces a value for COR that ranges from 0 to 15, reflecting the number of chips in the correlator's shift register that match the chips of the pseudo-noise sequence as shown in Diagram (d). In the system of using accumulators, the ΔCOR is the absolute value of 7.5 (½ of 15) minus COR rounded down to the nearest whole number as shown in Diagram (e). Diagram (f) shows a binary signal that results from applying the upper and lower thresholds to COR. This signal, i.e. the thresholded correlator output, controls the incrementing of the histogram counters in the embodiments using counters.

Figure 6:
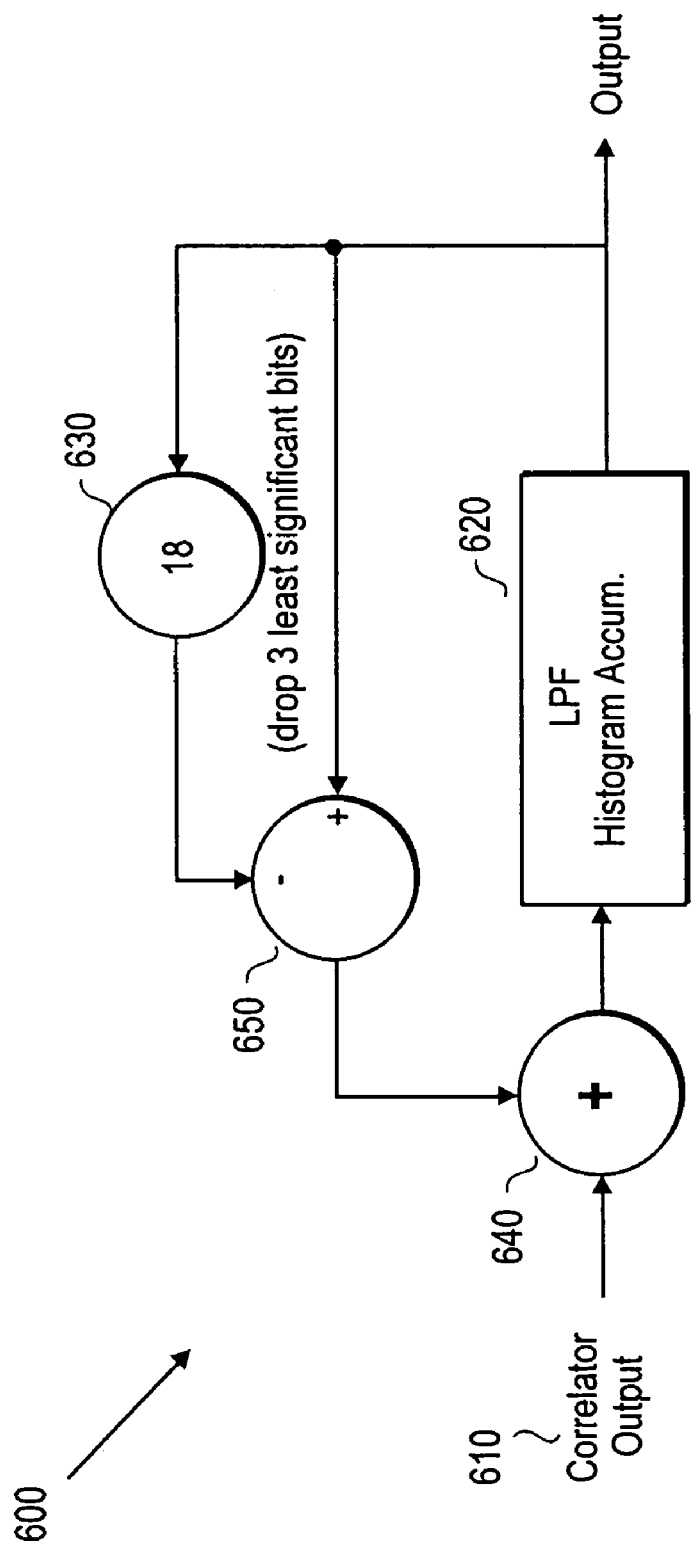
FIG. 6 illustrates a diagram of continuously histogramming the correlator output in one embodiment of the present invention.

FIG. 6 illustrates an implementation of one of the histogram accumulators described above which integrates the correlator output continuously instead of over a finite number of bit periods. In order to do this without overflowing histogram accumulators 620, at each pass through a histogram window, the current pass of correlator outputs 610 are added to the histogram at an adder 640. Therefore, the previous correlator outputs, which are already a part of the histogram, are weighted 650 by a fractional value 630 whereby the fraction decreases geometrically in each subsequent bit period. An example of implementing this is to multiply each counter/accumulator 620 by a fixed fraction 630 in a bit period before the correlator outputs pass through the histogram window. It is appreciated that a person skilled in the art of digital signal processing would know that this is equivalent to applying a first-order low pass filter (LPF) to the correlator output. For example, if the fraction used is seven-eighths (⅞), then a preferred implementation is to subtract from each histogram accumulator a right shifted version of itself, i.e. a right shifted by 3, before adding the next correlator output.

It is appreciated that other suitable implementations for histogramming accumulators can be used without departing from the scope of the present invention. For example, in another implementation, it is sufficient to right shift the histogram accumulators one bit, i.e. multiplying by ½, once every few bit periods. In this case, the threshold against which the histogram accumulators are compared would have to be adjusted depending on the number of bit periods since the last right shift.

Figure 7B:
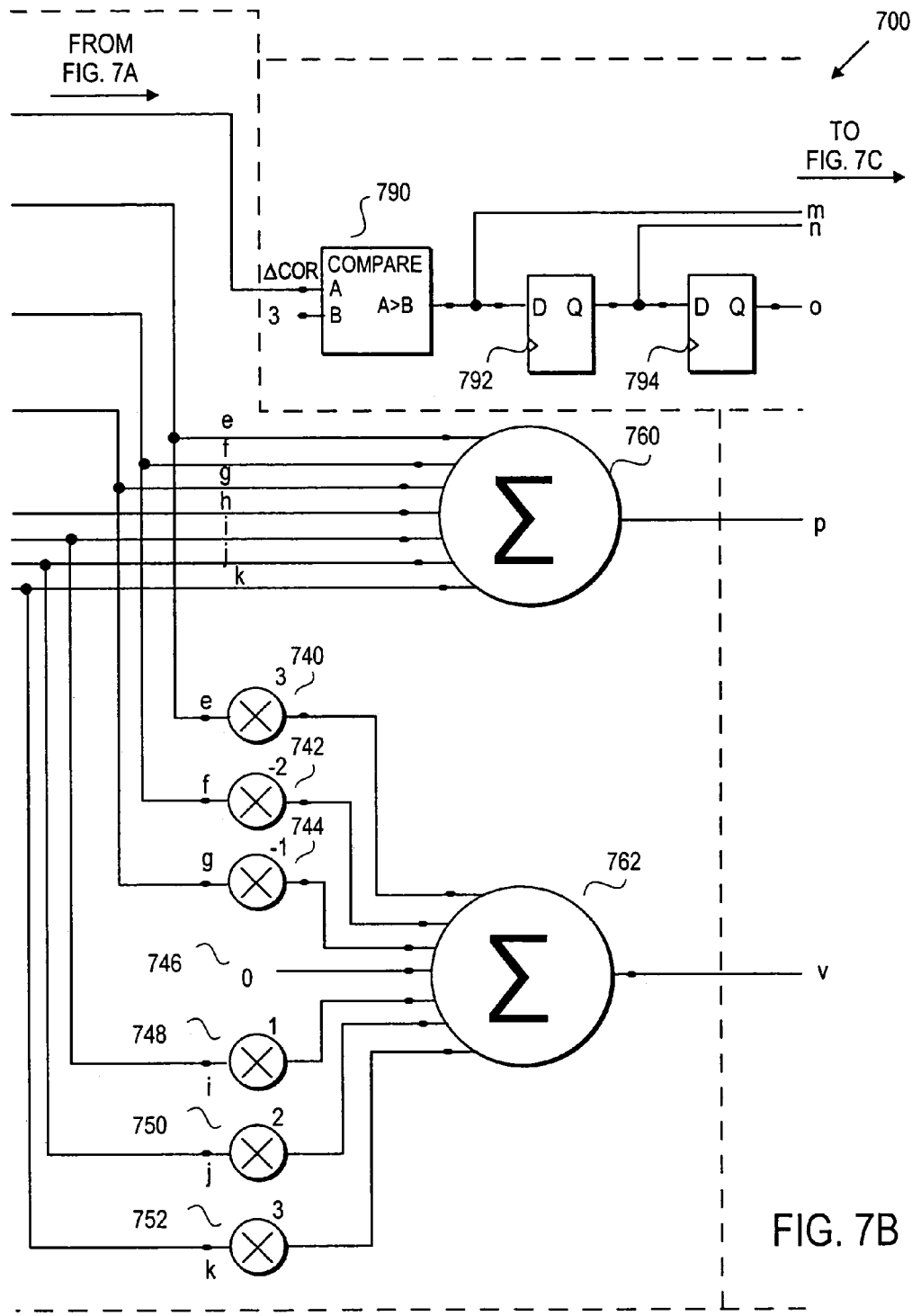
Figure 7C:
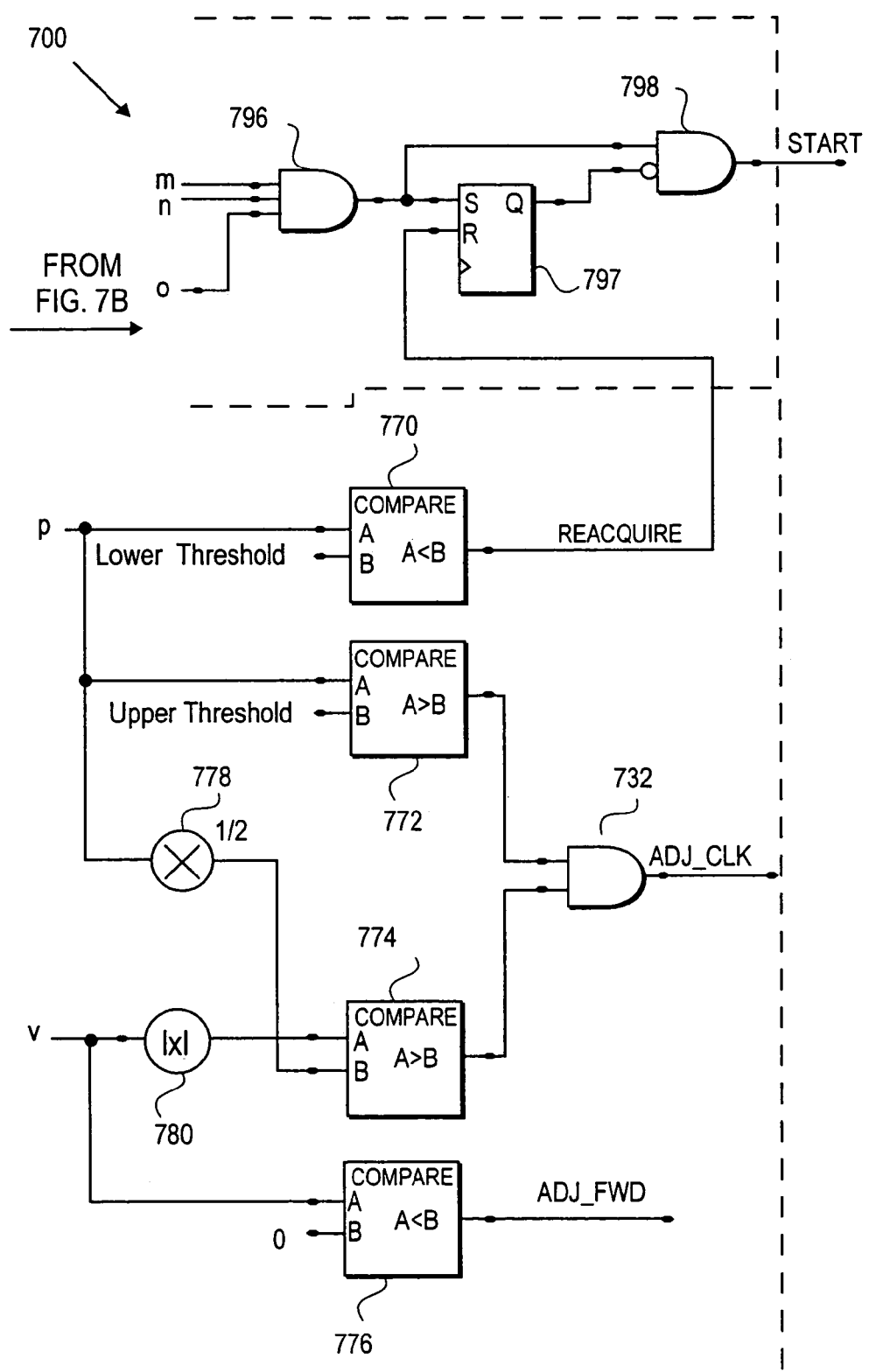

FIGS. 7A–7C illustrate a detailed diagram of a third embodiment of the pseudo-noise encoded digital data clock recovery circuit 700 in accordance with the principles of the present invention. The example shown implements four (4) samples per chip and a histogram window size of seven (7) samples. In systems with multiple samples per chip, the phase of a bit clock can be more accurately tracked by calculating the average sample position after each pass through a histogram window. The average sample position is the sum of the histogram accumulator values weighted by their associated sample positions divided by the sum of the histogram accumulator values weighted by one.

To implement this in a system with fifteen (15) chips per bit, the correlator produces a value COR that ranges from 0 to 15, reflecting the number of chips in the correlator's shift register that match the chips with the pseudo-noise sequence.

As shown in FIGS. 7A–7C, a ΔCOR 710 in a correlation circuit 703 is the absolute value 708 of 7.5 (½ of 15) 704 minus a COR 702 rounded down to the nearest whole number 706. The ΔCOR 710 then passes through the seven low pass filter (LPF) counter/accumulator 720–732 as shown in FIG. 6.

Each sample position within a histogram window is assigned a number which denotes its position in the window. For example, in a histogram window of seven sample positions 740–752 as shown, the successive sample positions can be numbered as −3, −2, −1, 0, 1, 2, and 3. At the end of each pass through the histogram window, two sums are calculated in a arithmetic circuit 719. The first sum 762 is the value 740 from the first histogram accumulator 720 times −3, plus the value 742 in the second histogram accumulator 722 times −2, plus the value 744 from the third histogram accumulator 724 times −1, plus the value 746 from the fourth histogram accumulator 726 times 0, plus the value 748 from the fifth histogram accumulator 728 times 1, plus the value 750 from the sixth histogram accumulator 730 times 2, and plus the value 752 from the seventh histogram accumulator 732 times 3.

The second sum 760 is the sum of the values from all seven accumulators 720–732. The average or optimal sample position where the correlator output is used to recover the original bit stream is indicated by the result of dividing the first sum 762 by the second sum 760. If the result is between −0.5 and +0.5, then the phase of a bit clock 799 remains the same, for example, at the center of the histogram window. If the result is between 0.5 and 1.5, then the phase of the bit clock and the histogram window is retarded by one sample position by asserting a signal ADJ_CLK from a decision circuit 777 to a counter 788 in a location circuit 714. If the result is between −1.5 and −0.5, then the phase of the bit clock is advanced by one sample position by asserting a signal ADJ_FWD as well as a signal ADJ_CLK from the decision circuit 777 to the counter 788 in the location circuit 714.

A decoder 715 in the location circuit 714 is used to enable the integration of the correlator output at each sample position. The decoder 715 is controlled by the output of the counter 788. If the accumulators 720 through 732 fail to register sufficient counts to indicate alignment of the correct bit clock with the histogram window, a reacquisition can be performed by a reacquisition circuit 791 by reacquisition circuitry components 790–798, similar to the reacquisition circuit components 452–458 shown in FIGS. 4A–4C.

It is appreciated that the technique of aligning a bit clock over a plurality of bit periods can be varied within the scope of the present invention. For example, it may not maintain a set of histogram accumulators for a histogram window. A result for the correct sample position can be produced by maintaining registers for the position weighted and non-weighted sums and updating the two registers with each pass through the histogram window. At each sample position within the window, the correlator output is added directly to the non-weighted sum and multiplied by its sample position before adding to the weighted sum. These two sums can be maintained continuously by multiplying by a fraction before each pass in the same fashion as histogram accumulators as described above.

Figure 8:
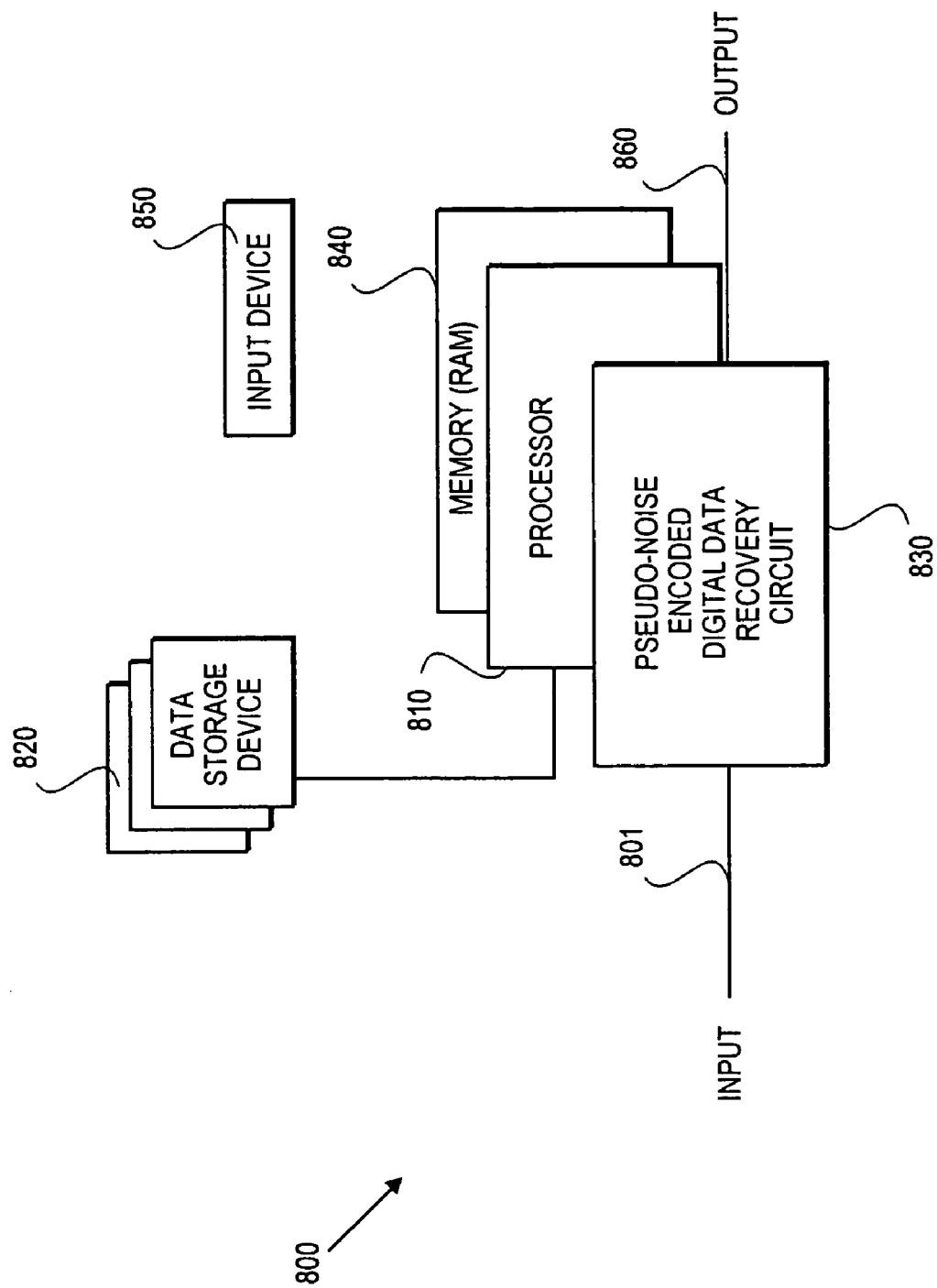
FIG. 8 illustrates an alternative hardware environment for the pseudo-noise encoded digital data clock recovery circuit in accordance with the principles of the present invention.

FIG. 8 illustrates an alternative hardware environment 800 for a pseudo-noise encoded digital data clock recovery circuit 830 in accordance with the principles of the present invention. Such hardware environment may include a processor 810, a data storage device 820, a memory (RAM) 840, and an input device 850. The clock recovery circuit 830 may operate under the control of an operating system which executes one or more computer programs. The operating system and the computer programs may be tangibly embodied in a computer-readable medium or carrier, e.g. one or more of the fixed or removable data storage devices 820, or other suitable data storage or data communication devices. Both operating system and the computer programs may be loaded from the data storage devices 820 into the memory 840 for execution by the processor 810. Those skilled in the art would recognize that the memory 840 is optional or may be a memory device embedded or otherwise coupled to the pseudo-noise encoded digital data recovery circuit 830. Further, both the operating system and the computer programs may comprise instructions which, when read and executed by the processor 810, cause the clock recovery circuit 830 to perform the steps necessary to execute the steps or circuit components of the present invention. An input signal 801 is input into the clock recovery circuit 830, and an output signal 860 is output from the clock recovery circuit 830.

Although an exemplary system configuration is illustrated in FIG. 8, those skilled in the art would recognize that any number of different system configurations performing similar functions may be used in accordance with the present invention.

Figure 9:
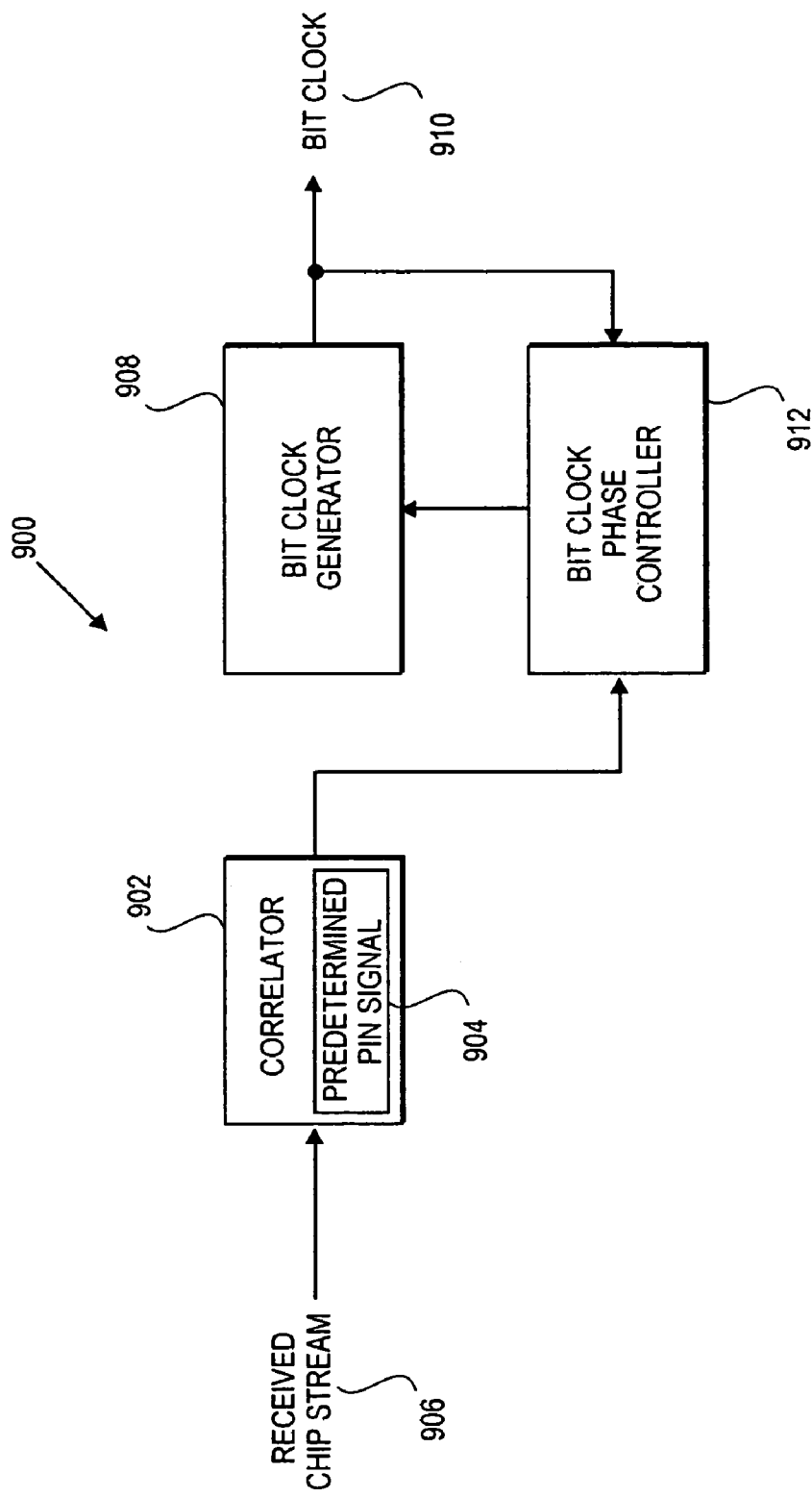
FIG. 9 illustrates a general diagram of a pseudo-noise encoded digital data clock recovery circuit in accordance with the principles of the present invention.

FIG. 9 illustrates a general diagram of a pseudo-noise encoded digital data clock recovery circuit 900 in accordance with the principles of the present invention. The recovery circuit 900 includes a correlator 902 for correlating a pseudo-noise sequence 904, which modulates an original bit stream, with a received chip stream 906. A bit clock phase controller 912 is coupled to the correlator 902. A bit clock generator 908 receives the output of the bit clock phase controller 912 and generates a bit clock 910 which determines a sampling position of the received chip stream 906 to recover the original bit stream from the received chip stream 906. The bit clock phase controller 912 is coupled to the output of the bit clock generator 908 and feeds a control signal back to the bit clock generator 908. The bit clock phase controller 912 maintains alignment between the received chip stream 906 and the pseudo-noise sequence 904 over a plurality of bit periods of the received chip stream 906 by adjusting the sample position of the bit clock 910.

The correlator 902 may include the correlation circuit as described above in FIGS. 1, 3, 4, and 7. Also, the bit clock phase controller 912 may include the arithmetic circuit, the decision circuit, and the counter circuit as described above. Further, the bit clock generator 908 may include the location circuit as described above. It is appreciated that the layout of the circuits can be varied within the scope of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A pseudo-noise encoded digital data clock recovery circuit for recovering an original bit stream from a received chip stream, comprising:

a correlator to correlate a pseudo-noise sequence with the received chip stream and generating a correlator output, the pseudo-noise sequence to modulate the original bit stream;

a phase controller, coupled to the correlator to histogram the correlator output of the correlator over the plurality of bit periods, wherein the phase controller includes a plurality of counters to histogram the correlator output over all sample positions in a bit period for the plurality of consecutive bit periods, each of the counters corresponding to each of the sample positions within the bit period and, wherein each of the counters is incremented when a corresponding thresholded correlator output generates a spike at the corresponding sample position; and a bit clock generator, coupled to the phase controller, to generate a bit clock which determines a sampling position of the received chip stream to recover the original bit stream from the received chip stream, the bit clock generator to use the histogram of the correlator output to select/adjust the sample position for the bit clock, wherein the bit clock generator adjusts the sample position of the bit clock to a position where the corresponding counter exceeds a threshold and, wherein the bit clock generator retains the same sample position of the bit clock where no counters exceed the threshold.

2. The circuit of claim 1, wherein the phase controller includes a plurality of counters to histogram the correlator output over a finite window of sample positions for the bit clock.

3. The circuit of claim 1, wherein the phase controller histograms the correlator output for a finite number of bit periods and restarts histogramming after the finite number of bit periods.

4. The circuit of claim 1, wherein the phase controller histograms continuously by digitally low pass filtering the correlator output.

5. A pseudo-noise encoded digital data clock recovery circuit for recovering an original bit stream from a received chip stream comprising:

a correlator to correlate a pseudo-noise sequence with the received chip stream and generating a correlator output, the pseudo-noise sequence to modulate the original bit stream;

a phase controller, coupled to the correlator to histogram the correlator output of the correlator over the plurality of bit periods;

a bit clock generator, coupled to the phase controller, to generate a bit clock which determines a sampling position of the received chip stream to recover the original bit stream from the received chip stream, the bit clock generator to use the histogram of the correlator output to select/adjust the sample position for the bit clock; and a comparator to compare the correlator output to a threshold and to generate a thresholded correlator output, wherein the phase controller histograms the thresholded correlator output with a plurality of counters.

6. The circuit of claim 5, wherein the phase controller comprises a plurality of accumulators to histogram the correlator output directly.

7. The circuit of claim 5, wherein the bit clock is based on the histogram of the counters that exceed a preset threshold.

8. The circuit of claim 6, wherein the bit clock is based on the histogram of the accumulators that exceed a preset threshold.

9. The circuit of claim 5, wherein the bit clock is based on a calculated average sample position for the bit clock.

10. A computer program storage medium readable by a computing system and encoding a computer program of instructions for executing a computer process for recovering an original bit stream from a received chip stream, the computer process comprising:

maintaining a history of correlation of the received digital chip stream with a pseudo-noise sequence over more than two bit periods;

generating and synchronizing a bit clock providing a threshold, comparing a correlator output to the threshold and generating a thresholded correlator output, wherein maintaining the history of correlation includes histogramming the thresholded correlator output with a corresponding counter over all possible sample positions for the bit clock; and wherein the generating and synchronizing a bit clock includes using the histogrammed correlator output to select/adjust the sample positions for the bit clock to a position where the corresponding correlation exceeds the threshold.

11. A computer data signal embodied in a carrier wave readable by a computing system and encoding a computer program of instructions for executing a computer process for recovering an original bit stream from a received chip stream, the computer process comprising:

maintaining a history of correlation of the received digital chip stream with a pseudo-noise sequence over more than two bit periods;

generating and synchronizing a bit clock providing a threshold, comparing a correlator output to the threshold and generating a thresholded correlator output wherein maintaining the history of correlation includes histogramming the thresholded correlator output with a corresponding counter, wherein maintaining the history of correlation further includes histogramming the correlator output over all possible sample positions for the bit clock; and wherein the generating and synchronizing a bit clock includes using the histogrammed correlator output to select/adjust the sample positions for the bit clock to a position where the corresponding correlation exceeds the threshold.

12. The medium of claim 10, wherein maintaining the history of correlation comprises histogramming the correlator output over all possible sample positions for the bit clock.

13. The medium of claim 10, wherein maintaining the history of correlation comprises histogramming the correlator output over a finite window of sample positions for the bit clock.

14. The medium of claim 10, wherein maintaining the history of correlation comprises histogramming the correlator output for a finite number of bit periods and restarting histogramming after the finite number of bit periods.

15. The medium of claim 10, wherein maintaining the history of correlation comprising histogramming the correlator output directly with a plurality of accumulators.

16. The medium of claim 15, wherein synchronizing the bit clock is based on the histogram of the accumulators that exceed a preset threshold.

17. The medium of claim 10, wherein synchronizing the bit clock is based on a calculated average sample position for the bit clock.

18. The carrier wave of claim 11, wherein maintaining the history of correlation comprises histogramming the correlator output over a finite window of sample positions for the bit clock.

19. The carrier wave of claim 11, wherein maintaining the history of correlation comprises histogramming the correlator output for a finite number of bit periods and restarting histogramming after the finite number of bit periods.

20. The carrier wave of claim 11, wherein maintaining the history of correlation comprising histogramming the correlator output directly with a plurality of accumulators.

21. The carrier wave of claim 11, wherein synchronizing the bit clock is based on a calculated average sample position for the bit clock.

* * * * *